J. ROTHCHILD.
CHECK-ROW PLANTER.
No. 176,244. Patented April 18, 1876.
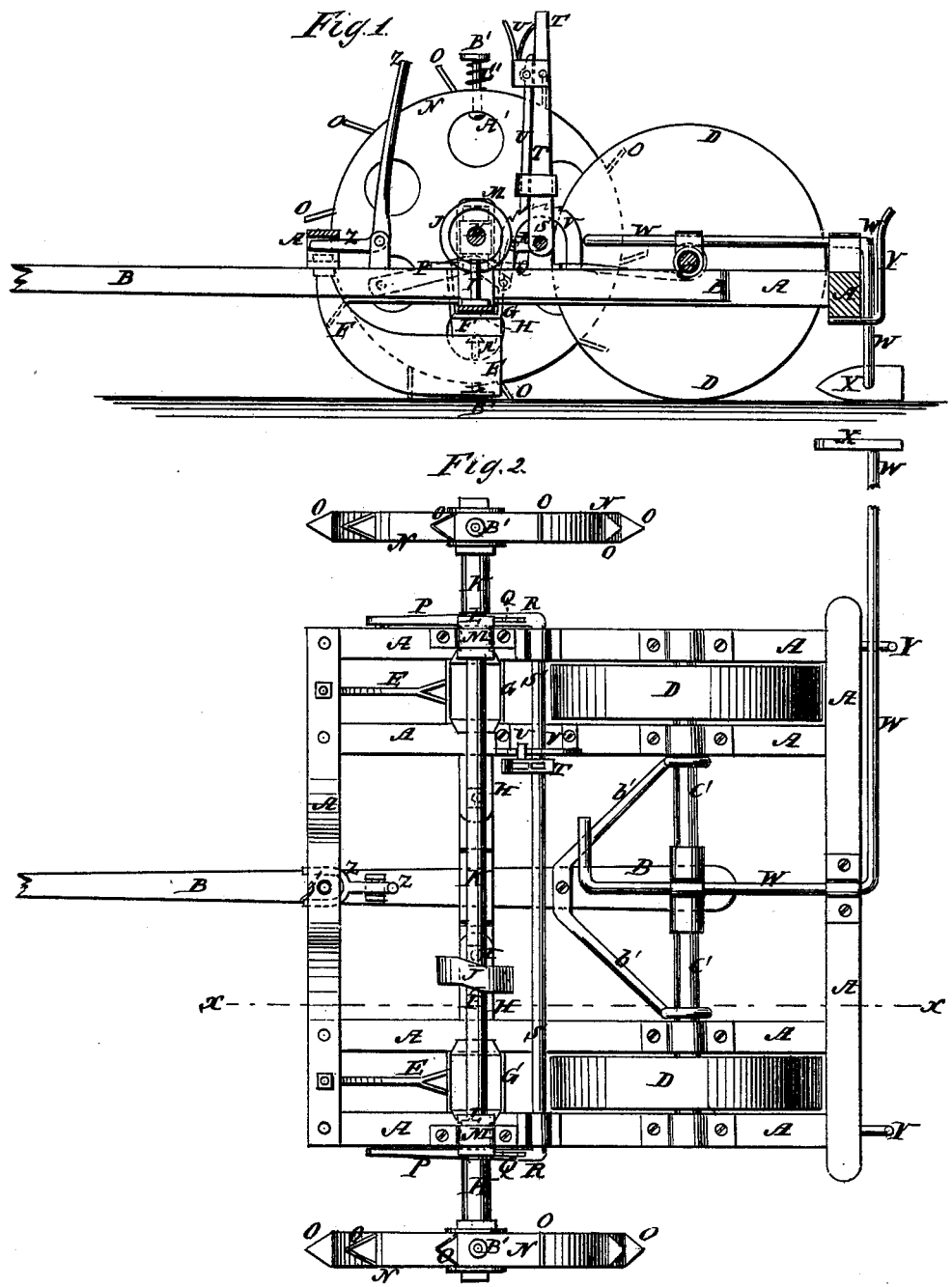

UNITED STATES PATENT OFFICE

JOSEPH ROTHCHILD, OF SHELBYVILLE, KENTUCKY.

IMPROVEMENT IN CHECK-ROW PLANTERS.

Specification forming part of Letters Patent No. 176,244, dated April 18, 1876; application filed November 27, 1875.

*To all whom it may concern:*

Be it known that I, JOSEPH ROTHCHILD, of Shelbyville, in the county of Shelby and State of Kentucky, have invented a new and useful Improvement in Check-Row Corn-Planter, of which the following is a specification:

Figure 1 is a vertical longitudinal section of my improved machine, taken through the line *x x*, Fig. 2. Fig. 2 is a top view of the same.

Similar letters of reference indicate corresponding parts.

The object of this invention is to furnish an improved corn-planter, which shall be so constructed as to plant the corn in accurate check-row, and which shall be simple in construction, and easily guided, manipulated, and controlled.

The invention consists in the several features of improvement hereinafter described, and pointed out in the claims.

A represents the frame of the machine, which consists of two pairs of side bars, connected at their forward and rear ends by cross-bars. The forward cross-bar of the frame A is arched, to give more space for the tongue B, which passes beneath it, and the rear end of which is pivoted to the axle C, and which is held in line with the length of the machine by the braces *b'*, attached at their forward ends to the tongue B, and pivoted at their rear ends to the axle C. The axle C is secured to the longitudinal bars of the frame A, and upon it revolve the transporting-wheels D, which are placed in the rear part of the spaces between the longitudinal bars of the frame A. E are the runners that open the soil to receive the seed, the forward ends of which are attached to the front cross-bars of the frame A, between the longitudinal bars of the frame A. The rear ends of the openers are forked, and are connected with the spouts or standards F, the upper ends of which are connected with the bottoms of the seed-hoppers G, so as to conduct the seed into the furrows opened by the runners E. The rear ends of the runners E and the rear sides of the spouts F are left open, so that the driver from his seat can see the seed as it drops to the ground. The seed is covered by the wheels D, the rims of which are made wide for the purpose. The seed is dropped by the bar H, which works in the lower parts of the hoppers G, and the middle part of which is arched, or bent four times at right angles to form an offset to pass over the tongue B, so that it may not interfere with the play of said tongue. To the seed-dropping bar H are attached two upwardly-projecting studs or pins, I, at a little distance from each other, so as to receive the double cam-wheel J, attached to the shaft K, so that the bar H may be slid forward and back at each revolution of the said cam-wheel J. The shaft K revolves in bearings in blocks L, that slide up and down in long keepers M, attached to the longitudinal bars of the frame A. To the ends of the shaft K are attached two wheels, N, to the rims of which, at suitable distances apart, are attached triangular points O, to enter the ground and prevent the wheels N from slipping. The triangular points O are set at such an inclination that they will enter the ground vertically, and thus further guard against the slipping of the wheels N. The pointed and flat form of the points O enables them to enter the ground easily, and causes them to take a firm hold upon the ground, so that the part at the surface of the ground cannot be forced back through the soil, and thus allow the wheels to slip. By this construction raising or lowering the shaft in effect increases or diminishes the circumference of the wheels N, so as to drop the seed at a greater or less distance apart, as may be desired. The sliding bearing-blocks L rest upon bars P, the forward ends of which are pivoted to the longitudinal bars of the frame A, and to their rear ends are pivoted the ends of links or connecting-bars Q, the other ends of which are pivoted to arms R, formed upon or rigidly attached to the ends of a shaft, S, that works in bearings attached to the longitudinal bars of the frame A, and to it is attached a lever, T, in such a position as to be easily reached and operated by the driver from his seat. The lever T is provided with a lever spring-pawl, U, which engages with the teeth formed upon the edge of a curved bar, V, across which the lever T projects, and the ends of which are attached to the frame A. By this construction, by operating the lever T the machine may be adjusted to plant the hills at any desired distance apart.

The shaft K is made of such a length that the wheels N may be at a distance from the openers E exactly equal to half the distance between said openers, so that the inner wheel N, at each return crossing, may run in the track of the outer wheel N at the preceding crossing.

A' are pins passing out through the rims of the wheels N, and having disks B' attached to their outer ends. Upon the pins A' are placed spiral springs C', the inner ends of which rest against the faces of the wheels N, and their outer ends rest against the disks B'. Two of the devices A' B' C' are attached to each wheel N, directly opposite each other, and in such positions that one of the disks, B', will always be upon the ground when a hill is dropped, so as to mark the cross-rows. The springs C' enable the disks to adjust themselves to mark the cross-rows however deep the points O may enter the ground.

W is a rod placed upon the central longitudinal line of the machine, and working in bearings attached to the frame A. The rod W, at the rear side of the rear cross-bar of the frame A, is bent at right angles, and to its outer end is attached a plate, X, which rests upon the ground and marks it. The rod and plate W X may be turned down at either side of the machine, and the said rod is supported against the draft-strain when turned down by a hook, Y, attached to the ends of the rear cross-bar of the frame A. The rod W is made of such a length that the marking-plate X, when turned down, may rest upon the ground at the distance of two rows from the central line of the machine, so that the mark made by said plate X may be beneath the tongue in the return crossing, and may thus be an additional guide to the driver in guiding the team. Z is a bent lever, pivoted at its angle to the tongue B, and the forward end of which rests beneath the front cross-bar of the frame A, so that by operating the lever Z the forward end of the tongue B, being supported by the neck-yoke of the team, the forward end of the frame A may be raised, raising the wheels N from the ground and stopping the operation of the seed-dropping device. The lever Z may be provided with a pawl and ratchet, to hold it in any position into which it may be adjusted. $z'$ is a guide-rod, attached to the tongue B, and which passes through a hole in the forward cross-bar of the frame A, to keep the said tongue B from getting out of the central line of the machine.

Having thus described my invention, I claim as new and desire to secure by Letters Patent—

1. The wheels N N, having projecting points O on their peripheries, in combination with a rotary shaft, K, adjustable vertically, to drop seed at a greater or less distance apart, as described.

2. The combination of slide-bearings L, movable vertically in keepers M, with pivoted bars P, links Q, and rock-shaft arms R, as set forth.

JOSEPH ROTHCHILD.

Witnesses:
GEO. BAYLOR ALLEN,
CHAS. P. HARPER.